A. MASCHKA.
Plow-Point.
No. 50,942.
Patented Nov. 14, 1865
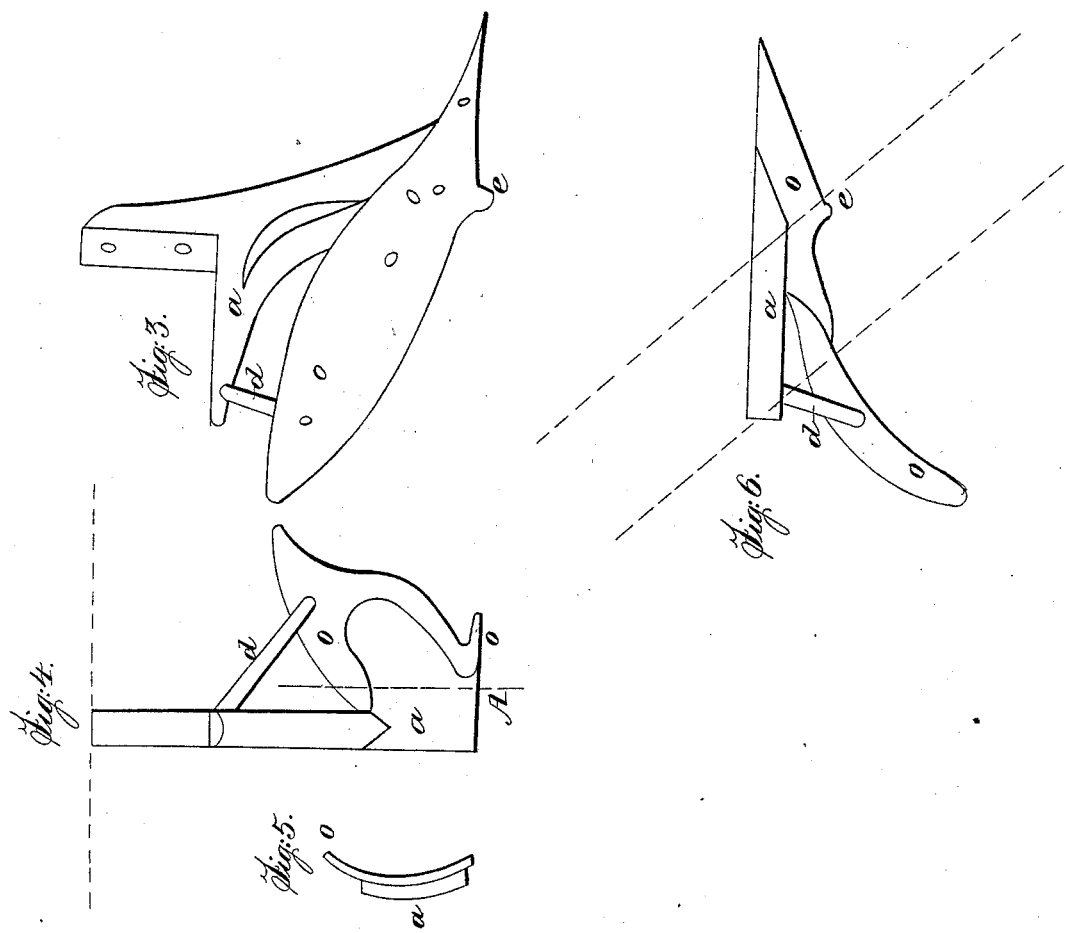
Witnesses:
D Howrk
C W Theo Krausch
Inventor:
Anton Maschka

UNITED STATES PATENT OFFICE.

ANTON MASCHKA, OF CHICAGO, ILLINOIS.

IMPROVEMENT IN PLOWSHARES.

Specification forming part of Letters Patent No. 50,942, dated November 14, 1865.

*To all whom it may concern:*

Be it known that I, ANTON MASCHKA, of Chicago, in the county of Cook, in the State of Illinois, have invented a new and Improved Mode of Constructing Plowshares; and I do hereby declare that the following is a full, clear, and exact description thereof, reference being had to the accompanying drawings and the letters of reference marked thereon.

The nature of my invention consists, principally, in the peculiar shape of the plowshare, representing, so to say, a curved knife, and is calculated to be attached to a diagonal frame, either separate or in numbers alongside of each other.

To enable others skilled in the art to make and use my invention, I will proceed to describe its construction.

Figure 3 is a side elevation of the plowshare. Fig. 4 is an end elevation of the plowshare. Fig. 5 is a transverse section through line A. Fig. 6 is a plan of the plowshare.

Letter $a$ represents the share-stand. Letter $o$ represents the mold-board. Letter $e$ represents the root-cutter. Letter $d$ represents a brace.

I construct my plowshare as follows: The share-stand $a$ is forming at its upper end a right angle to fit the diagonal share-timber. The lower part of $a$ has the shape of the mold-board $o$, having the object to receive the mold-board and effecting its strengthening. The brace $d$, extending from the upper part of the stand $a$ to the upper inner end of the mold-board $o$, is also calculated to strengthen the mold-board $o$. The little projection $e$ (seen at the low side of the mold-board $o$) forms the root-cutter. My plowshare differs, also, from any other, as it does not contain any landside, and, being sharper pointed, effecting thereby a great saving of power for its operation. The part of the iron share-stand $a$ to which the mold-board $o$ is fastened is so shaped as to act as a part of the mold-board.

As far as the results of my experiments lead me, I am convinced that I can apply ten shares to the diagonal frame of my plow and work them with two horses, (upon cultivated ground,) plowing five feet wide. The number of shares and their size to be used in a plow depends upon the work to be done.

What I claim as my invention, and desire to secure by Letters Patent, is—

In combination with the mold-board $o$, stand $a$, and brace $d$, the root-cutter $e$, when constructed in the manner herein set forth.

ANTON MASCHKA.

Witnesses:
C. W. THEO. KRAUSCH,
C. D. WOLF.